Nov. 3, 1953
R. C. ZEIDLER
2,657,781
FRICTION CLUTCH AND LEVER ASSEMBLY
Filed Sept. 29, 1949
2 Sheets-Sheet 1
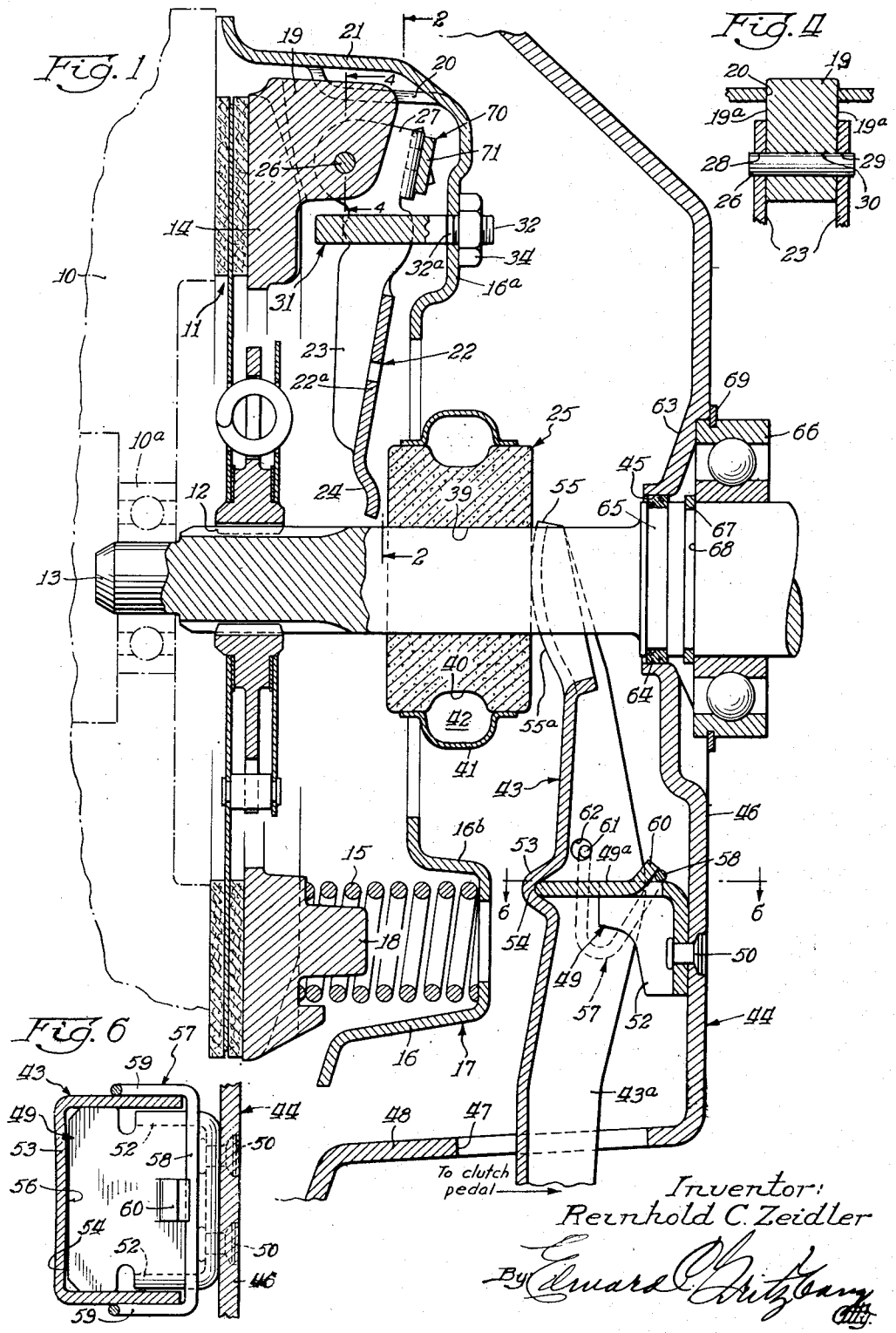
Inventor:
Reinhold C. Zeidler
By Edward ...
Atty.

Nov. 3, 1953 R. C. ZEIDLER 2,657,781
FRICTION CLUTCH AND LEVER ASSEMBLY
Filed Sept. 29, 1949 2 Sheets-Sheet 2
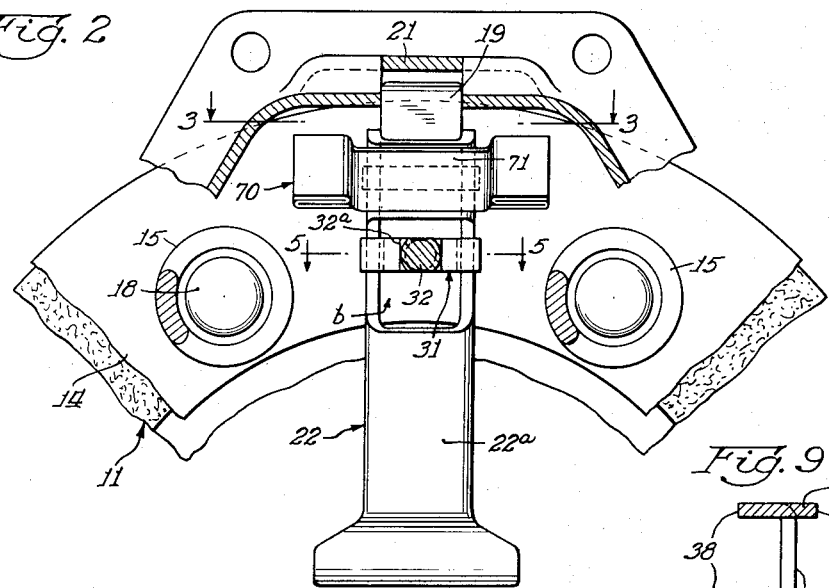
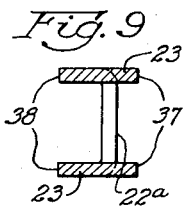
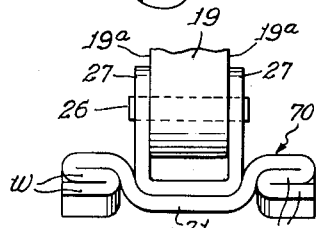
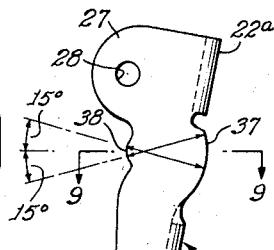
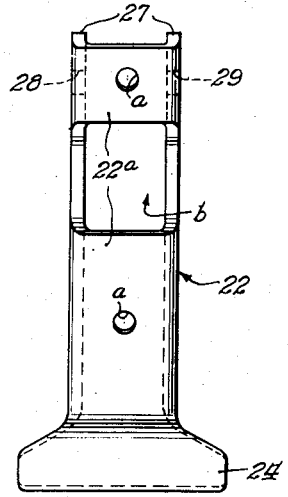
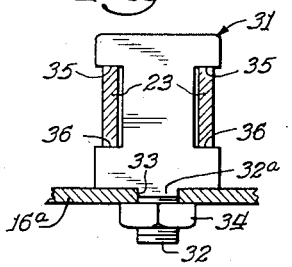
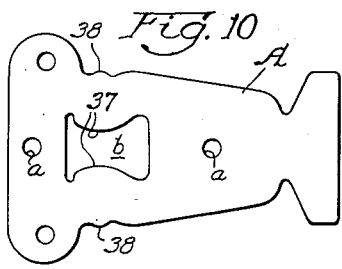
Inventor:
Reinhold C. Zeidler Patented Nov. 3, 1953

2,657,781

UNITED STATES PATENT OFFICE 2,657,781

FRICTION CLUTCH AND LEVER ASSEMBLY

Reinhold C. Zeidler, Detroit, Mich., assignor to Borg-Warner Corporation, Chicago, Ill., a corporation of Illinois Application September 29, 1949, Serial No. 118,555

7 Claims. (Cl. 192—99)

The present invention relates generally to clutches for coupling a pair of driving and driven members. More particularly, the improvements contemplated herein are embodied in a friction clutch assembly such as are usually employed for releasably connecting the engine or drive shaft to the driven transmission shaft of a motor driven vehicle and the like.

One of the primary objects of the present improvements is to simplify the construction and operation of a friction clutch assembly such as contemplated herein, and to improve the efficiency and operation of such assembly.

Another principal object hereof is to provide a novel clutch assembly which may be manufactured at a low cost and is comprised of an assembly of parts or members, a proportion of which are made of metal stampings. In this connection, it will be seen that the release levers, the fulcrum plates, the operating lever or fork, and the mounting bracket for the fork, all comprise members which are blanked out of and formed from sheet metal to thereby reduce the over-all production cost and to facilitate their assembly with other clutch parts.

Still another object resides in providing a novel and low cost release lever and fulcrum means therefor which are constructed in a manner to be quickly mounted in the assembly.

A further object is to provide an improved operating lever or fork and a novel mounting therefor which are adapted to be readily assembled with the other parts of the clutch. This mounting arrangement is such that it effects a squaring of the fork fingers against a radial end face of the throw-out collar or block carried by the driven shaft.

Also, there is provided a novel fulcrum plate arrangement for the clutch release lever, such means being of special construction for cooperation with the release lever which has an arcuate portion of small radius which has rolling contact with a shoulder on a fulcrum plate. The clutch release lever also has a second arcuate fulcrum region which is engaged with the second shoulder on the fulcrum plate.

Other objects, aims, and advantages of the improvements contemplated herein will be apparent to persons skilled in the art after the construction and operation of the present clutch assembly is understood from the within description. It is preferred to accomplish the numerous objects and advantages of this invention, and to practice the improvement, in substantially the manner hereinafter fully described and as more particularly pointed out in the appended claims. Reference is now made to the accompanying drawings which form a part of this specification.

In the drawings:

Fig. 1 is an axial section of a friction clutch assembly embodying the novel details of the present invention;

Fig. 2 is a plan view of a fragmentary portion of the clutch assembly, the view being partly in section along the plane of line 2—2 on Fig. 1;

Fig. 3 is a detail view of the upper or pivotal region of the novel release lever as viewed along the plane of line 3—3 on Fig. 2;

Fig. 4 is a radial section of the pivotal portion of the release lever taken along the plane of line 4—4 on Fig. 1;

Fig. 5 is a plan view of the fulcrum plate for the lever, the lever being shown in section along the plane of line 5—5 on Fig. 2;

Fig. 6 is a sectional view of the mounting means for the throw-out fork taken along the plane of line 6—6 on Fig. 1;

Fig. 7 is a front view of the release lever detached, and

Fig. 8 is a side view thereof;

Fig. 9 is a transverse section of the release lever taken along the plane 9—9 on Fig. 8; and Fig. 10 is a plan showing the sheet metal blank from which the release lever is formed.

The drawings are to be understood as being more or less of a diagrammatic character for the purpose of illustrating a typical or preferred form of the friction clutch assembly contemplated herein, and in these drawings the same reference characters identify like parts in the different views.

By way of example, one form of a clutch assembly, in which the present improvements are adapted to be embodied, is shown herein. The arrangement illustrated in section in Fig. 1, comprises generally a driving member 10, which may be the fly-wheel of a motor vehicle engine, a driven friction disc 11 splined as at 12 on a driven shaft 13 and adapted to be frictionally engaged with said flywheel by an annular pressure plate 14. The forward end region of driven shaft 13 is piloted in bearings 10a in the flywheel 10. The pressure plate is normally urged into clutch-engaging position by means of packing springs 15 which are interposed between said pressure plate and an axially extending portion 16 of a sheet metal cover plate 17. The pressure plate has axially projecting stubs or posts 18 for receiving the adjacent end portions of the packing springs, and the cover plate has embossed seats 16b for the springs, said cover being attached to the rear face of the flywheel in the usual manner, as by bolts (not shown).

A driving connection between the flywheel and the pressure plate is established by providing several axially extending lugs 19 on the rear face of the pressure plate 14 which protrude into and snugly but freely engage the edges of apertures 20 in the adjacent portion of the cover plate 17, said lugs 19 having milled side faces 19a. It is here mentioned that the apertures 20 are formed in the cover plate stamping by a die-shearing operation which is made parallel to the clutch axis to outwardly displace a narrow strip 21 of the cover plate side wall to provide spaces for the lugs 19, such operation taking place at the same time other holes are pierced in the flange and the back wall of the cover.

The release levers 22, and the arrangements for mounting these levers, comprise one of the novel features of the present improvements. The details of one of these levers, which is graphically illustrated in Figs. 7, 8 and 10, will now be described. The release lever comprises a sheet metal stamping, the initial blank A having a contour such as shown in Fig. 10, and having therein two longitudinally spaced holes a—a and an irregular shaped aperture b, all on the longitudinal center line of the blank A. After being stamped, the blank is then centered on a forming die by means of the holes a—a and the two side flanges 23 are bent down of equal depth from the body portion 22a to impart a U-shaped section to the lever and also the desired curvature to the duck-bill foot 24.

As shown in Figs. 1 to 4, the levers 22 are pivotally carried by the axially extending lugs 19 of the pressure plate, and they project radially inward from these lugs. A simple and positive means of attaching the release lever to the pressure plate has been devised so that the arrangement is capable of taking the tangential thrust imposed on the lever when it is engaged by the thrust collar or bearing block 25 which is made of a carbonaceous material and has sliding movement longitudinally on the driven shaft 13 as shown on Fig. 1. A small diameter pin 26 has been found to be most efficient for pivotally mounting the lever. The side flanges 23 of the lever have arcuate ears 27 at their fulcrum outer regions, said ears being pierced by aligned pin-receiving holes 28 and 29, the hole 28 in one flange being slightly larger than the hole 29 in the other flange. This permits the pin 26 to just pass through the larger hold 28 freely, but the pin becomes a press fit in the smaller hole 29, while the mid-portion of the pin is passed through a transverse bearing hold 30 in the pressure plate lug 19. The press fit has been found to be more than ample to safeguard against any future loosening, and for economy of time and labor in assembling, all of the pins are pressed into the respective levers in one operation using a corresponding number of hydraulic or air cylinders. As a result of this arrangement the pin rotates with the lever and the smooth, hard, burnished surface of the pin is ideal to rotate in the softer cast metal of which the pressure plate and lug is made. It also has wear-resisting qualities which are enhanced by lubricating the pin prior to assembly so that friction created by the rotation of the pin under load is very low. The pressure plate lug 19 is straddled by the outer region of the lever, and the milled side faces of the lug fit closely but freely against the surfaces of the ears 26 and flanges 23 of the lever to prevent lateral bodily movement of the lever 22.

As a result of the novel construction of the lever 22 and the arrangement for pivotally mounting the same on the pressure plate, the regular lever adjustment need not be made to correct the parallelism of the inner duck-bill ends 24 of the levers. With the tolerances which have been provided, a majority of the clutch assemblies may be assembled with the lever tips in plane within .030". The parallelism of the levers will be checked with an indicator in the same fixture in which they are assembled, and should it be found that a lever be out of plane more than .020", the highest lever will be bent down using a suitable tool which is properly shaped to receive the duck-bill 24 end of the lever beyond the side flanges 23 so that such end may be deflected transverse to the center line of the lever, or the tool may be warped to one side to correct any twist found in the lever.

The lever 22 has cooperative association with a novel fulcrum plate 31, the details of which are shown in Fig. 5. This fulcrum plate 31 is preferably a thick metal stamping having a contour which is generally H-shape or I-shape with a threaded attaching stud 32 at the outer edge of one of its cross-members and projecting longitudinally of the body of the fulcrum plate. Between the threads and the adjacent end of the fulcrum-plate blank there is a rectangular portion 32a adapted to fit into a similarly shaped hole 33 in the adjacent back wall 16a of the cover plate 17 which prevents the fulcrum plate twisting when a nut 34 of the self-locking type is tightened on the threaded portion. In assembling this fulcrum plate 31, it is inserted into lever aperture b with the width of the plate passing diagonally through such aperture, after which the plate is turned to a position for insertion into hole 33 of the cover and the nut then threaded on the protruding end of stud 32 to lock the fulcrum plate in assembly. In operating position, the cross-members of the fulcrum plate provide shoulders 35 and 36 properly spaced apart to receive between them the specially formed radii portions at the edges of the lever side flanges 23 with just sufficient clearance for free movement of the lever when the latter is operated.

Referring now particularly to Figs. 8 and 10, it will be seen that the edges of the lever flanges 23 at each side of aperture b have curved formations 37 made on an arc of a circle inscribed from a center adjacent the opposite edges of such flanges, and said opposite flange edges have curved formations 38 made arcs of considerably less radii than the radii of the first-mentioned arcs 37. Preferably, the large and small radii 37 and 38, as delineated in Fig. 8, are struck from the same center with the result that these formations comprise arcs of two concentric circles. When the levers and mountings have been completely assembled, the arcuate portions 38, which have the smaller radii, contact the fulcrum plate shoulders 35, whilst the other arcuate portions 37 are contiguous the fulcrum plate shoulders 36. During operation of the lever 22, the arcs 38 take the loading when the clutch is being released and said arc portions 38 are purposely made small so that when the lever operates through its various angular positions, a minimum amount of movement is imparted to the fulcrum plate 31. It will be seen that the point at which this small radius 38 contacts its fulcrum plate shoulder is on the center line of the pivot pin 26. Thus, when the clutch is released, the lever pivots around the pin 26 and the radius 38 of the lever rolls toward the center of the clutch. Because the amount of this roll is so small, by virtue of using a small radius and keeping it on the centerline with the pin, instead of the lever sliding on the fulcrum-plate shoulder and causing wear, the left end of the fulcrum-plate deflects outwardly by slightly distorting the rear wall of the cover plate stamping.

The clutch release lever 22 above described is well adapted for use either with or without a centrifugal weight 70 such as is shown in detail on Figs. 1, 2 and 3. This weight 70 conveniently takes the form of a sheet metal stamping which is welded to the outer face of the lever body portion 22a adjacent the opening b therein and approximately axially opposite the pivotal pin 26. The stamping is an elongate metal strip having its end regions doubled-over on itself as at W to give it additional weight, and the intermediate region 71 of the strip is dished to snugly fit the contacted portion of the lever, all in the manner shown in Fig. 3. When the present clutch assembly is used on low-speed engines, for example in tractors, there would be no benefit derived from this centrifugal weight and the cost would be reduced by omitting it.

The carbon block thrust bearing 25 has an axial bore 39 to receive driven shaft 13 and the outer cylindrical surface of the block is recessed or channeled as at 40 so that in conjunction with the channeled metal stamping 41 embracing it, an annular reservoir 42 for grease is provided. Because of the large supply of lubricant that may be packed into the bearing initially, subsequent lubrication is not necessary and, accordingly, a conventional grease fitting is not required to be attached to the bearing 25. In assembling the metal stamping 41 on the carbon block 25, the recesses in the two parts are filled with lubricant flush to their respective outside and inside diameters. The metal stamping 41 is a continuous one-piece annular sheet metal band which has an inner diameter approximately the same or slightly less than the outer circumferential cylindrical diameter of the block 25, and, accordingly, the stamping is moved axially of the block and is pressed over the block. Alternatively, the stamping could be placed on the block and then heated to shrink the stamping to tightly engage the block, or the stamping could have a free fit over the carbon block, and by means of a press operation exerting pressure on the body portions of the stamping in a direction such that the latter would be reduced in diameter sufficiently to produce a tight fit on the carbon block. It is contemplated that the stamping could be a split ring which could surround the block, then be drawn into tight engagement with the block by any suitable means and the ends of the ring be united, as by welding, to insure the maintenance of the tight fitting of the ring on the block. Certain improvements of the thrust bearing block are illustrated and described in applicant's prior application, Serial Number 671,780, filed May 23, 1946, and now abandoned.

The carbon block thrust bearing floats on driven shaft 13 between the clutch levers 22 and the operating lever or fork 43 so that when the vehicle is being driven with the clutch engaged, the carbon block will be rotating at probably the same speed as the shaft 13 and its lubricated side faces will be rubbing just slightly against either the clutch levers or the operating fork 43 with only a minimum of friction and creating little or no heat.

The operating lever or fork and its mounting assembly, comprise a novel feature of the present improvements, and are clearly illustrated in detail in Fig. 1. The fork 43 comprises an elongate sheet metal stamping having a generally U-shaped cross-section with a bifurcated upper region and a long arm portion 43a which is coupled in any suitable manner to the usual manually operated clutch release pedal. A rearwardly extending housing 44 is anchored to a stationary portion of the vehicle chassis and has an axial aperture 45 centrally of its radial rear wall portion 46 to receive the driven shaft 13. There is another aperture 47 in the rearwardly extending side wall 48 of said housing, through which long arm 43a of the operating lever or fork projects. Heretofore, the usual practice has been to mount the fork on a ball stud which is either an upset or screw machine piece fastened or screwed into either the wall of the clutch bell housing or to the forward wall of the transmission case. Generally, the spherical surface of the stud on which the fork articulates has a diameter of three-quarters to one inch, and past experience indicates that with this large amount of surface in sliding contact any initial lubrication soon disappears and friction develops.

The fork mounting means presented herein comprises a stamped bracket 49 of sheet metal securely anchored by rivets 50 or otherwise to the inner surface of the radial rear wall portion 46 of housing 44. This bracket, which has an L-shaped section, is reinforced by side flanges 52, and it is arranged with a horizontal member 49a extending in a forward direction to provide a fulcrum at its outer edge for seating in a concavo-convex deformation 53 extending transversely across the adjacent region of the fork. The fulcrum edge 54 of the bracket is cyanided and its radius is very small so that the sliding contact between this fulcrum edge and the fork portion 53 is minimized and friction becomes negligible. The radially inward fingers 55 of the fork straddle the driven shaft 13 between the thrust bearing block 25 and the rear wall 46 of the housing and are slightly bulged in the direction of the bearing block to provide convex surfaces 55a which effect smooth contact with the block 25. To permit the fork fingers 55 to square themselves against the radial rear face of the thrust bearing block 25, the deformed portion 53 of the fork is formed with a slight crown as indicated at 56 where it contacts the fulcrum edge 54 of the bracket 49. Hair-pin type spring means 57 keep the fork in position against the bracket, said springs being preferably made of bent spring wire with an intermediate straight portion 58 connecting corresponding V-shaped arms 59 of the springs and engaged back of a lip 60 struck up from the bracket body, and the termini of the other arms of the springs are bent toward each other to provide hooked ends 61 which are entered in holes 62 in the flanges of the fork. Details of the above-described arrangements are shown in Fig. 6.

A novel feature of the present improvements is the arrangement for preventing leakage from the transmission front bearing into the housing 44.

Usually this housing, whether made of stamped steel or of cast iron, is either integral with or attached to the transmission case. In order to retain the front main shaft bearing in the transmission case and provide a means of retaining the lubricant, a separate cap is usually bolted either to the housing or to the transmission case. This, of course, involves an extra member, plus the screws, as well as drilling and tapping operations which add to the cost. In the improved arrangement, the stamped housing 44 is bulged inwardly as at 63, flanged, then burnished smooth at its inside diameter to define the aperture 45 for the driven shaft 13. A combination cork and rubber ring 64 fits between this diameter and a groove 65 in the shaft. The cork ring is slightly larger in diameter than the inside diameter of the housing aperture 45, so that after assembly, it fits the inside diameter snugly, preventing leakage at this point; while the side of the cork ring fitting the sides of the groove rather closely prevent leakage around the inside. This eliminates the above-mentioned cap and incidental operations, and there is a saving in cost by letting the cork ring bear directly in the housing. The anti-friction bearing unit 66 surrounds shaft 13 outside the housing 44 and is held against forward movement by a snap-ring 67 seated in a groove 68 in the shaft, and there is another snap-ring 69 carried by the bearing unit in engagement with the rear wall 46 of the housing.

While this invention has been described in detail in its present preferred form or embodiment, it will be apparent to persons skilled in the art, after understanding the improvements, that various changes and modifications may be made therein without departing from the spirit or scope thereof. It is aimed in the appended claims to cover all such changes and modifications.

What is claimed is:

1. In a friction clutch, a driven friction disc; a flywheel and a pressure plate between which said friction disc is adapted to be engaged; a cover carried by said flywheel and enclosing said pressure plate; spring means acting on said cover and pressure plate to pack said pressure plate in a direction for clutch engagement; a release lever pivotally carried by said pressure plate; said release lever comprising a sheet metal stamping of U-shaped cross-section defining a body portion and longitudinal side flanges, each flange having oppositely extending arcuate regions at its two margins, the arcuate region at one margin of each flange having a smaller radius than the arcuate region at the other margin; and a fulcrum plate on said cover straddled by said lever and having spaced shoulders engaged by said arcuate regions of said lever flanges, the small radius regions having rolling contact with an adjacent shoulder of said fulcrum plate, and the large arcuate region arranged to contact the second shoulder of said fulcrum plate thereby to maintain said first arcuate regions engaged with said second shoulder during movement of said lever.

2. In a friction clutch, a driven friction disc; a flywheel and a pressure plate between which said friction disc is adapted to be engaged; a cover carried by said flywheel and enclosing said pressure plate; spring means acting on said cover and pressure plate to pack said pressure plate in a direction for clutch engagement; a release lever pivotally carried by said pressure plate, said release lever comprising a sheet metal stamping having a U-shaped cross-section which defines an elongate body portion and longitudinal side flanges, each flange having oppositely extending arcuate regions at its two margins, and one of such arcuate regions being of smaller radius than the other; and a fulcrum plate on said cover straddled by said lever and having spaced shoulders engaged by said arcuate regions, the small radius regions of said lever having rolling engagement with adjacent shoulders of said fulcrum plate.

3. In a friction clutch, a driven friction disc; a flywheel and a pressure plate between which said friction disc is adapted to be engaged; a cover carried by said flywheel and enclosing said pressure plate; spring means acting on said cover and pressure plate to pack said pressure plate in a direction for clutch engagement; a release lever pivotally carried by said pressure plate, said release lever comprising a sheet metal stamping having a U-shaped cross-section which defines an elongate body portion and longitudinal side flanges, each flange having oppositely extending arcuate regions at its two margins, and one of such arcuate regions being of smaller radius than the other; and a fulcrum plate on said cover having a generally I-shape, the cross arms of such I-shape defining first and second spaced shoulders, the small radius regions of said lever having rolling engagement on said first shoulders and the other arcuate regions of said lever cooperating with said second shoulders.

4. In a friction clutch, a rotatable pressure plate having an axially extending lug with a transverse bore; a cover rotatable with said pressure plate; a radially extending release lever carried by said pressure plate, said lever comprising a sheet metal stamping of U-section defining an apertured, elongate body portion having longitudinal flanges along the sides thereof, said lever at its radially outer region straddling said lug, the radially outer regions of said lever flanges having aligned pin holes therein in registry with said bore, one of said holes having a radius smaller than the other; a hard metal pivot pin cooperating with said holes and bore and having a drive fit in said smaller hole to retain said pin in position; and an I-shape fulcrum plate defining spaced pairs of shoulders, said fulcrum plate being carried by said cover and extending through the aperture in said lever body portion, opposite edge portions of said lever flanges being positioned between and in cooperative association with respective pairs of shoulders on said fulcrum plate.

5. A clutch release lever adapted for pivotal mounting on the pressure plate of a friction clutch assembly in cooperation with a fulcrum plate, said lever comprising an elongate body of U-shaped cross-section defined by longitudinal flanges and a connecting web having an aperture therein extending between said flanges; a foot portion at one end of said web; ears at the other ends of said flanges for pivotal connection with the pressure plate; first arcuate regions on said flanges at the margins of said web aperture; and second arcuate regions on the edges of said flanges opposite said first arcuate regions and having smaller radii than said first regions, said small second arcuate regions having rolling engagement with a pair of shoulders on the fulcrum plate, and said first arcuate regions contacting a second pair of shoulders on the fulcrum plate for guiding the lever during said rolling movement of the small arcuate regions.

6. In a friction clutch including spaced rotatable members between which a driven friction plate is adapted to be engaged, one of said members defining an axially movable pressure plate, those improvements which comprise a sheet metal release lever of U-shaped cross-section pivoted at one end on said pressure plate and defining an elongate body portion and upstanding side flanges extending longitudinally thereon, each flange being particularly characterized by oppositely extending curved segments on its two longitudinal margins, and one of said segments being of smaller radius than the other segment; and a fulcrum plate having spaced pairs of shoulders engaged by the respective segments, the small segments having rolling engagement with one pair of shoulders and the large segments contacting the other pair of shoulders for guiding said lever during said rolling movement of the small segments.

7. In a friction clutch including spaced rotatable members between which a driven friction plate is adapted to be engaged, one of said members defining an axially movable pressure plate; those improvements which comprise a release lever pivoted at one end on and carried by said pressure plate and defined by an elongate body portion and spaced flanges extending longitudinally thereon, said flanges being particularly characterized by oppositely extending arcuate regions on opposite longitudinal margins of said flanges and said regions on one side being of smaller radius than the arcuate regions on the opposite sides of said flanges; and a fulcrum plate having spaced shoulders engaged by the respective arcuate regions, the small arcuate regions having rolling engagement with one shoulder and the large arcuate regions contacting a second shoulder for guiding said lever during rolling movement of the small arcuate regions.

REINHOLD C. ZEIDLER.

References Cited in the file of this patent

UNITED STATES PATENTS

| Number | Name | Date |
|---|---|---|
| 1,605,562 | Short | Nov. 2, 1926 |
| 1,668,668 | Beemer | May 8, 1928 |
| 1,930,276 | Lenz et al. | Oct. 10, 1933 |
| 2,021,973 | Wemp | Nov. 26, 1935 |
| 2,035,519 | Apple | Mar. 31, 1936 |
| 2,036,005 | Wemp | Mar. 31, 1936 |
| 2,060,773 | Pearmain | Nov. 10, 1936 |
| 2,234,843 | Katcher | Mar. 11, 1941 |
| 2,250,394 | Reed | July 22, 1941 |
| 2,296,535 | Nutt | Sept. 22, 1942 |
| 2,319,123 | Gamble | May 11, 1943 |
| 2,328,895 | Dorman | Sept. 7, 1943 |
| 2,406,244 | Nutt | Aug. 20, 1946 |
| 2,417,035 | Zeidler | Mar. 4, 1947 |

FOREIGN PATENTS

| Number | Country | Date |
|---|---|---|
| 437,052 | Great Britain | 1935 |
| 540,865 | Great Britain | 1941 |